United States Patent [19]

Bernard et al.

[11] 4,405,725

[45] Sep. 20, 1983

[54] FOAMED POLYISOCYANURATES

[75] Inventors: David L. Bernard, Pittsburgh; John K. Backus, Allison Park; Anthony J. Doheny, Jr., Pittsburgh, all of Pa.

[73] Assignee: Mobay Chemical Corporation, Pittsburgh, Pa.

[21] Appl. No.: 817,308

[22] Filed: Jul. 20, 1977

Related U.S. Application Data

[63] Continuation of Ser. No. 687,140, May 17, 1976, abandoned, which is a continuation of Ser. No. 829,145, May 29, 1969, abandoned, which is a continuation-in-part of Ser. No. 625,635, Mar. 24, 1967, abandoned.

[51] Int. Cl.³ ............................................. C08G 18/14
[52] U.S. Cl. .................................. 521/112; 521/118; 521/131; 521/160
[58] Field of Search .................. 260/2.5 AJ, 2.5 AT, 260/77.5 NC, 2.5 AW; 521/112, 118, 131, 160

[56] References Cited

U.S. PATENT DOCUMENTS 3,516,950 6/1970 Haggis ........................... 260/859 R
3,931,065 1/1976 Ashida et al. ....................... 521/112

FOREIGN PATENT DOCUMENTS 908337 10/1962 United Kingdom ............ 260/2.5 A

OTHER PUBLICATIONS

Carwin, "Papi–Polymethylene Polyphenylisocyanate", Data Sheet of The Carwin Co., (now Upjohn Co.), published Dec. 1961.

*Primary Examiner*—Maurice J. Welsh
*Attorney, Agent, or Firm*—Gene Harsh; Joseph C. Gil

[57] ABSTRACT

Foams having improved flammability characteristics are prepared by reacting a polyaryl polyalkylene polyisocyanate with 2 to 15 parts of an active hydrogen compound having a molecular weight of from about 350 to about 10,000 and from one to six active hydrogen containing groups as determined by the Zerewitinoff method in the presence of a blowing agent, a stabilizer and a catalyst.

6 Claims, No Drawings

FOAMED POLYISOCYANURATES

This is a continuation of application Ser. No. 687,140 filed May 17, 1976, now abandoned which itself is a continuation of application Ser. No. 829,145 filed May 29, 1969, now abandoned, which itself is a continuation-in-part of application Ser. No. 625,635, filed Mar. 24, 1967, now abandoned.

This invention relates to foamed polyisocyanurates and more particularly to foamed polyisocyanurates which have improved properties particularly with regard to their flammability and structural properties.

Foams prepared heretofore by polymerizing polyisocyanates to form isocyanurates in the presence of a blowing agent have so far shown such anomalous flammability behavior that their use as building materials is uncertain. For example, polyisocyanurate foams based on polyurethane prepolymers with free —NCO groups where many of the —NCO groups are prereacted to form urethane groups generate so much smoke and noxious fumes in a fire that these foams are unsafe for use in many building applications.

One would expect that elimination of the relatively temperature sensitive urethane groups would result in less generation of smoke and fumes in a fire where these foams are present. However, foams without any urethane groups which are based entirely on an organic polyisocyanate pop and burst into fragments like pine or cedar logs when they are in a fire. The resulting small pieces actually contribute not only to smoke and fume generation but contribute fuel for the fire as well. Several standard tests are available for measuring these properties including ASTM E-84 and the Bureau of Mines torch test.

It is, therefore, an object of this invention to provide foams which are devoid of the foregoing disadvantages. Another object of this invention is to provide foams which have satisfactory flammability characteristics so that they will meet most building codes. A further object of this invention is to provide isocyanurate foams which have improved resistance to burning and particularly improved resistance to flame spread and smoke generation properties which will permit them to be used in conjunction with standard building materials without the loss of other properties. A further object of this invention is to provide a process for the preparation of improved polyisocyanurate foams. Still another object of this invention is to provide cellular plastics which are useful as materials of construction while being relatively safe with regard to the preservation of human life as well as for the confinement of fire and the prevention of property loss in the event of fire.

The foregoing objects and others which will become apparent from the following description are accomplished in accordance with this invention, generally speaking, by providing foams prepared by reacting a large excess of a polyaryl polyalkylene polyisocyanate with from about 2 to about 15 parts by weight per hundred parts of said polyaryl polyalkylene polyisocyanate of an organic compound which contains from one to six active hydrogen containing groups as determined by the Zerewitinoff method, which active hydrogen containing groups will react with an organic polyisocyanate. The active hydrogen containing compound must have a molecular weight of from about 350 to about 10,000. The reaction is carried out in the presence of a blowing agent, a foam stabilizer and a catalyst which will cause the trimerization of isocyanate groups to form an isocyanurate group. The use of 2 to 15 parts of the active hydrogen containing compound per hundred parts of the polyaryl polyalkylene polyisocyanate overcomes the difficulties of the prior art foams. The smoke generated when foams prepared with less than 2 parts or more than 15 parts of the active hydrogen compound per hundred parts of the polyaryl polyalkylene polyisocyanate are burned is unsatisfactory. There are other properties which are also much better if the proportions of the isocyanate and the active hydrogen compound are in the range specified. When less than 2 parts of the active hydrogen compound are used per 100 parts of the polyisocyanate the foams pop and burst into fragments; one might even describe it as an explosion, when they are burned. Also, the foams based on less than 2 parts of active hydrogen compound per hundred parts of polyisocyanate will burn through in the torch test[1] in less than one minute, whereas foams based on only 2 parts of active hydrogen compound possess a burn through time in excess of 15 minutes. When more than 15 parts of active hydrogen compounds are used in the formulation, foams are obtained which generate a great amount of smoke on burning and show very poor resistance to burning, even to the point of being a prime source of fuel for the fire. The use of 2 to 15 parts of active hydrogen compound in the formulation gives overall superior physical properties but especially good flammability characteristics.

[1]The torch test is described at pages 28-29 of Journal of Cellular Plastics for January 1966. The burn through time is the time it takes for a 2000° F. flame to penetrate a one inch sample of foam.

The term "flammability" is used broadly herein to refer to the burning characteristics of the polyisocyanurates from many viewpoints including self-extinguishing properties, fuel contribution, flame spread, smoke generation, smoke density and gases produced. The prime consideration in the early development of flame resistant foamed plastics, particularly for building materials, had been whether they could be made self-extinguishing. However, at this time, just making the product self-extinguishing is not enough since the foam must also meet other standards and particularly the flame-spread and smoke generation requirements of building codes. It is often the case that when the plastic product has been made self-extinguishing, i.e. the plastic does not continue to burn after the source of flame has been removed, it is still unsatisfactory for use as a building material from the standpoint of fuel contribution, flame-spread, smoke generation and gases produced in a fire where other materials continue to supply the fuel. Further, additives often used heretofore to make foams self-extinguishing have been found to cause the smoke development and gaseous fumes to increase to dangerous levels so that they cannot be safely used in building materials.

Any suitable polyaryl alkylene polyisocyanate may be used in the practice of this invention including those which have the formula:

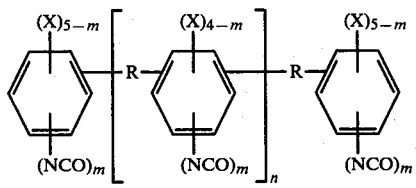

in which R is an organic radical and preferably an aliphatic radical obtained by removing the carbonyl oxygen from an aldehyde or ketone and is preferably —CH$_4$—, m is 1 or 2, X is halogen, lower alkyl or hydrogen and n is 0, 1, 2 or 3. The aliphatic radical, R, in the foregoing formula may be obtained by removing the carbonyl oxygen from any suitable aldehyde or ketone such as formaldehyde, acetaldehyde, propionaldehyde, butyraldehyde, n-heptaldehyde, benzaldehyde, cyclohexane aldehyde, acetone, methyl ethyl ketone, methyl-n-propyl ketone, diethyl ketone, hexanone-2, hexanone-3, di-n-propyl ketone, di-n-heptyl ketone, benzophenone, dibenzyl ketone, cyclohexanone and the like. To illustrate, if one removes the carbonyl oxygen from formaldehyde, H$_2$C=O, the radical remaining is a methylene radical or from acetone, CH$_3$—CO—CH$_3$, the radical remaining is

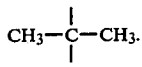

When X is halogen, it may be any suitable halogen, but is preferably chlorine or bromine and further, it is preferred that the amount of chlorine or bromine fall between about one percent and fifteen percent by weight of the compound. When X is lower alkyl, it is most preferably methyl or ethyl but other lower alkyl radicals such as propyl, butyl and the like may be the radical X. The polyaryl polyalkylene polyisocyanates are preferably mixtures of di- and higher polyisocyanates. Thus, n in the formula preferably has an average value of from about 0.1 to about 1.5. To illustrate, in a mixture of isocyanates of the above formula containing 90 percent diisocyanate and 10 percent triisocyanate, n would have an average value of 0.1. For a mixture containing 20 percent di-, 30 percent tri-, 30 percent tetra- and 20 percent penta-isocyanate, the average value of n would be 1.5. A most preferred average value for n is between about 0.5 and about 1.1 with about 40 percent to about 60 percent of the mixture of polyisocyanates being a diisocyanate.

Isocyanates of the above formula are well known and available commercially. They may be prepared as disclosed in U.S. Pat. No. 2,683,730. A specific isocyanate suitable for use in accordance with the present invention may be obtained by reacting about 60 parts of aniline with about 25 parts of formaldehyde (aqueous, 37 percent CH$_2$O) and about 74 parts of HCl (aqueous, 30 percent HCl) at a temperature of about 80° C. to about 100° C. for about 1.5 to about 2 hours and then reacting this product with NaOH and separating out the crude amine. About 100 parts of phosgene are then reacted with the resulting amine until a product having an amine equivalent of about 135 and containing about 31 percent free —NCO is obtained. The free excess phosgene and substantially all of the solvents used, if any, are then removed.

The commercially available polyphenyl methane polyisocyanates are particularly adapted for use in the present invention. The best products have 40 percent to 60 percent 4,4'-diphenylmethane diisocyanate, an amine equivalent of about 125 to about 140, about 0.04 to about 0.4 percent by weight hydrolyzable chloride, about 0.1 to about 0.6 percent by weight total chloride and having a flash point of about 400° F.

Any suitable active hydrogen containing compound having a molecular weight of 350 to 10,000 and having one to six active hydrogen containing groups which will react with an —NCO group may be used. The preferred molecular weight range is 350 to 3,000. It is preferred to use compounds that have free hydroxyl groups but compounds with carboxylic acid groups, free primary or secondary amino groups, thiol groups or the like may also be used.

The use of these particular active hydrogen containing compounds in the particular amounts specified is a critical feature of this invention. The limit on the functionality of the active hydrogen compound and its molecular weight are quite important to the physical properties and the flammability characteristics of the foams produced. As explained above, foams based on less than 2 parts of active hydrogen compound per 100 parts of the polyisocyanate are not only too brittle for practical application but also pop and burst into fragments when in a fire. Also, above 15 parts of active hydrogen compounds per hundred parts of polyisocyanate the flammability characteristics are bad, particularly the smoke generation and flame spread factors. All of these conditions must be met for satisfactory production of foams suitable for use as building materials.

Any suitable compound having one to six free hydroxyl groups and a molecular weight of 350 to 10,000 may be used such as, for example, ethers, esters, thioethers, acetals, hydrocarbons and the like.

The hydroxyl compounds include the alkylene oxide modified wood resins obtained by the destructive distillation of pine wood and particularly pine stumps. The resins taken from wood include materials both soluble and insoluble in aliphatic hydrocarbons and which are obtained from wood by destructive distillation. They may be further cooked or blown with air in order to produce various polymerizates. The exact nature of these materials is not known but they are sold under various tradenames including VINSOL, BELRO, PLASTICIZED VINSOL, SOLO and CROSBY-900.

"Vinsol" resin is a resin taken from pine wood and it is hard, brittle, darkened and thermoplastic. It has a specific weight of 1,218 (20° C.), a softening point of 112°–115° C., an ignition point of 235° C. and an acid number of 93. It is very insoluble in the petroleum solvents, soluble in alcohols, ketones and esters and partially soluble in the aromatic hydrocarbons. This resin, at a high melting point, is obtained from the first extraction fraction with a solvent in the course of the destructive distillation of pine wood from the south of the United States. It is a complex mixture of numerous constituents, including acid phenol products in the form of phenols of a high molecular weight and or carboxylated phenols. It also contains acid products from resin acids and oxidized resin acids. Moreover, neutral compounds of high molecular weight are present, which probably come from resinous and polymerized terpenes. It also contains a little wax. In addition to carboxyl and phenolic hydroxyl groups, the "Vinsol" product has double bonds and active hydrogen atoms which may cause it to enter into many reactions.

The "Belro" resin is a similar product and is of a non-crystalline nature. It has a specific weight of 1.138, a softening point of 86° C., an ignition point of 210° C. and an acid number of 119. It contains 60% of products insoluble in oil and is partly soluble in the aliphatic hydrocarbons and in carbon tetrachloride and soluble in ethyl acetate, alcohol, acetone and the aromatic hydrocarbons. It forms a thermoplastic acid resin of a darkened color. It contains the acids usually present in resins, oxidation and polymerization products of those acids and terpenes and a small quantity of the usual colored and neutral constituents of resins. The acid number is in the neighborhood of 120. This product is drawn from the last extraction fraction by solvents during the destructive distillation of wood.

"Crosby 900" resin is a thermoplastic acid resin of a darkened color obtained from the refining of wood resin by a carefully regulated heat treatment in which a reduction in the acid number, an increase of melting point and a reduction of the insolubles in the naphtha is obtained. A typical analysis reveals an acid number of 70, a melting point of 103° C., 40 percent insolubility in naphtha, a saponification index of about 110 and about 30 percent of non-saponifiable product. Chemically, this resin resembles the "Vinsol" and "Belro" products.

"Solo" resin is also a thermoplastic acid resin of darkened color, which is obtained by the refining of wood resin. It has a softening point of about 118° C. and an acid number of about 90. Chemically, it resembles the other resins. A typical analysis indicates an acid number of 97, a melting point of 118° C., an insolubility in a petroleum solvent of 94 percent, a saponification index of 148 and about 13 percent of non-saponifiable product.

These wood resins can be modified by reacting them with an alkylene oxide such as ethylene oxide, propylene oxide, ethylene chlorohydrin, styrene oxide or the like in order to prepare a product which has a molecular weight within the range specified; for example, ethylene oxide modified Vinsol having a molecular weight of about 500 and the like. It is also possible to use the monoesters of various glycols with high molecular weight acids such as, for example, the reaction product of melissic acid, cerotic acid, lignoceric acid, stearic acid and the like with, for example, ethylene glycol, propylene glycol, butylene glycol, amylene glycol, hexamethylene glycol or the like, in order to prepare a monoester of the glycol which has a sufficient molecular weight to fall within the range of 350 to 10,000 and preferably 500 to 3,000. Specifically the reaction product of 1 mol of any of the glycols set forth above with one mol of any of the acids set forth above will produce a product which falls within the range specified. One may also use the reaction product of an alkylene oxide with a monoamine having one reactive hydrogen atom such as, for example, the reaction product of diethyl amine with an alkylene oxide to prepare a monohydroxy compound such as, for example, the reaction product of diethyl amine with ethylene oxide or propylene oxide to prepare a product having a molecular weight of about 500. It is also possible to use the alkylene oxide modified alcohols or acids such as, for example, the reaction product of ethylene oxide, propylene oxide, ethylene chlorohydrin, styrene oxide or the like with any of the monohydric alcohols or monocarboxylic acids set forth above provided the reaction is carried out to a sufficient extent to yield a molecular weight within the range specified including methyl alcohol, ethyl alcohol, n-propyl alcohol, isopropyl alcohol, n-butyl alcohol, n-hexyl alcohol, n-heptyl alcohol, n-octyl alcohol, lauryl alcohol, stearyl alcohol, oleyl alcohol and the like. Specific examples include the reaction product of ethylene oxide or propylene oxide with lauryl alcohol and the like having a molecular weight of 300 or 3,000. It is preferred in accordance with the invention to use products which have a functionality greater than 1, i.e. from 2 to 6. Included in this category are, for example, the polyalkylene ether polyols which can be prepared by initiating the polymerization of an alkylene oxide with an initiator such as water, ethylene glycol, propylene glycol, trimethylol propane, glycerine, pentaerythritol, alpha methyl-d-glucoside, adonitol, xylitol, mannitol, sorbitol, dulcitol, methylene dianiline and particularly 4,4'-diphenylmethane diamine, toluene diamines including 2,4-toluene diamine, 2,6-toluene diamine and the like, ammonia, triethanolamine, phosphoric acid, particularly that which is a mixture of from about 75 to 90 percent phosphorus pentoxide and the balance water, all of which may be modified with various alkylene oxides including ethylene oxide, propylene oxide, butylene oxide, amylene oxide, styrene oxide, ethylene chlorohydrin and the like to prepare polyethers which have a molecular weight in the range specified and particularly products such as polyethylene glycol having a molecular weight of 400 and 4,000, polypropylene glycol having a molecular weight of 400, 750, 1200 and 2000 and the like. A further example is castor oil.

Still another type of compound containing one free hydroxyl group and having a very high molecular weight which may be used are the so-called drying and semi-drying vegetable oils such as, for example, linseed oil, safflower oil, corn oil, sunflower oil, perilla oil, chinawood oil, oiticica oil, poppy seed oil, sesame oil, soybean oil and the like, which have been modified with an alkylene oxide, for example, or by the introduction of an ethylenically unsaturated alcohol such as allyl alcohol, chloroallyl alcohol, meta allyl alcohol, beta-ethyl allyl alcohol, beta-propyl allyl alcohol, beta-phenyl allyl alcohol and the like, in order to introduce alcoholic hydroxyl groups.

The polyesters may also be used including, for example, polyesters of various di- or polyhydric alcohols with various di- or polycarboxylic acids such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, a,b-diethylsuccinic acid, isophthalic acid, terephthalic acid, hemimellitic acid, trimellitic acid, trimesic acid, mellophanic acid, prehnitic acid, pyromellitic acid, 1,4-cyclohexane dicarboxylic acid, 3,4,9,10-perylene tetracarboxylic acid, benzene pentacarboxylic acid, as well as acid anhydrides such as phthalic anhydride and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylol propane, 1,3,6-hexanetriol, triethanolamine, pentaerythritol, xylitol, mannitol and the like. It is to be understood that no combination of acid and alcohol should be used which will produce a functionality greater than 6 or an extent of esterification outside the range of molecular weight which is specified for these products.

The polyesters may also be a lactone polyester prepared by the polymerization of an admixture containing a lactone and an organic initiator either in the presence or absence of an ester interchange catalyst to form lactone polyesters of widely varying and readily controllable molecular weights. The polymerization is initiated by reacting the lactone with one or more compounds having two reactive hydrogens capable of opening the lactone ring either with or without the aid of a catalyst and adding it as an open chain without forming water of condensation. Compounds that are suitable for initiating the polymerization include those organic compounds which contain two hydroxyl groups or two primary amino groups or two secondary amino groups or mixtures of such groups.

The lactone used as a starting material may be any lactone, or combination of lactones having at least six carbon atoms such as, for example, from six to eight carbon atoms in the ring and at least one hydrogen substituent on the carbon atom which is attached to the oxy group in the ring. In one aspect, the lactone used as starting material can be represented by the general formula:

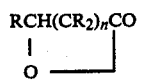

in which n is at least four, for example, from four to six, and at least n+2 R atoms are hydrogen, the remaining R atoms being hydrogen, alkyl, cycloalkyl, alkoxy or single ring aromatic hydrocarbon radicals. Lactones having greater numbers of substituents other than hydrogen on the ring and lactones having five or less carbon atoms in the ring are considered unsuitable for the purposes of the invention because polymers derived from such compounds have a tendency to revert to the monomer, particularly at elevated temperatures.

Among the substituted epsilon-caprolactones considered most suitable for the purposes of the invention are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so long as the epsilon carbon atom is not disubstituted; alkoxy epsilon-caprolactones such as methoxy and ethoxy epsilon-caprolactones, and cycloalkyl, aryl, and aralkyl epsilon-caprolactones such as cyclohexyl, phenyl and benzyl epsilon-caprolactones.

Lactones having more than six carbon atoms in the ring, e.g., zeta-enantholactone and eta-caprylolactone may also be employed.

Another class of materials which may be used includes the phosphorus containing polyols which have free —OH groups and which may contain tertiary nitrogen atoms. Examples of some such suitable phosphorus containing compounds include di(hydroxyalkyl)alkyl phosphonites, R—P—[O—(R'—O)$_n$H]$_2$, alkyl-di(hydroxyalkyl)phosphinites, RO—P[(R'—O)$_n$H]$_2$, hydroxyalkyl phosphites, P—[O—(R'—O)$_n$H]$_3$, hydroxyalkyl phosphates, PO—[O—(R'—O)$_n$H]$_3$, and the like in which R is lower alkyl or phenyl (examples of lower alkyl are methyl, ethyl, propyl, butyl and the like) and R' is alkylene, preferably having from 1 to 4 carbon atoms, such as methylene, ethylene, 1,2-propylene, 1,2-butylene and the like and n is an integer, preferably below 10. Many examples of some such suitable compounds are disclosed in U.S. Pat. Nos. 3,009,939; 3,047,608; 3,053,878; 3,081,331; 3,088,917; 3,131,206 and 3,092,651.

In addition, one may use reaction products of phosphoric acid with a polyhydric alcohol or phosphorus-containing polyols which are prepared by reacting a half ester of an unsaturated carboxylic acid and a polyhydric alcohol with a trialkyl phosphite. Phosphorus containing polyols which also contain nitrogen may be used including those having the formula:

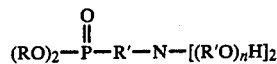

where R and R' have the meanings given above and n is a positive integer sufficient to give a molecular weight of 350 to 10,000 such as

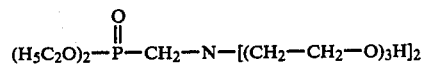

Halogen and/or other phosphorus containing compounds having a functionality and molecular weight within the critical limits of this invention may also be used. Some such suitable compounds include alkylene oxide adducts, particularly ethylene oxide and propylene oxide adducts of decabromodiphenyl and polyhalogenated biphenyls generally, tetrabromophthalic anhydride, pentaerythritol dichloride, halogenated bisphenols, especially bisphenol A; epoxylated polyhalo hydroquinones such as epoxylated tetrachlorohydroquinone, the polyglycidyl ether of polyhalophenols such as pentahalophenol; phosphorus containing polyesters from polyhydric alcohols, unsaturated esters of halogen-containing acids; triallyl phosphine oxide condensates of unsaturated polyesters such as those prepared from 2,2-bis-(p-hydroxyethoxyphenyl)propane, maleic anhydride, adipic acid; fumaric acid and propylene glycol; maleic anhydride and diethylene glycol; ethylene glycol, dimethyl terephthalate and fumaric acid and so on; the phosphonates formed by a Mannich reaction of a dialkyl hydrogen phosphonate with formaldehyde and diethanolamine and the like and mixtures thereof.

In addition to the hydroxyl compound, one may also use acids, amines and the like, or compounds which contain both acid groups and hydroxyl groups or amino groups and hydroxyl groups or the like. Furthermore, one may adjust the proportions of the components going into the polyester so that a product which contains free carboxylic acid groups having a molecular weight in the range specified is produced instead of one having free hydroxyl groups. In fact, polyesters with free carboxylic acid groups may be desirable for the invention since amide groups have a tendency to give better properties from a flammability viewpoint than do the urethane groups.

The acids which may be used alone or in conjunction with other compounds include melissic acid, cerotic acid, lignoceric acid, dimerized linoleic acid, the reaction product of two mols of a dicarboxylic acid with one mol of ethylene glycol such as, for example, the reaction product of two mols of phthalic acid with one mol of ethylene glycol or one mol of propylene glycol, terephthalic acid may be substituted for the phthalic acid. Furthermore, one may use the reaction product of two mols of a dicarboxylic acid such as phthalic acid or terephthalic acid with one mol of ethylene diamine or other alkylene diamine such as propylene diamine, phenylene diamine or the like. In addition one may use phosphorus containing carboxylic acids such as, for example, the phosphine oxide having the formula:

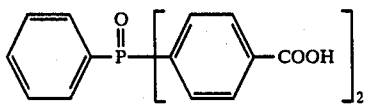

One may also use trimerized linoleic acid as well as mixtures thereof with the dimerized linoleic acid. Furthermore, the reaction product of three mols of a dicarboxylic acid such as phthalic acid or terephthalic acid with one mol of triethanolamine or with one mol of triethanolpropane may be used as the carboxyl terminated compound. In addition, linoleic acid may be polymerized to form a product having four free carboxylic acid groups which is suitable for use in accordance with the present invention. When the monofunctional compounds are used it is preferred to prereact them with the polyaryl polyalkylene polyisocyanate and then prepare the polyisocyanurate foam.

Any suitable emulsifier or stabilizing agent may be used in the preparation of the isocyanurate foams of this invention including, for example, sulfonated castor oil or the like, but it is preferred to use a foam stabilizer which is based on silicone such as, for example, a polydimethyl siloxane or a polyoxyalkylene block copolymer of a silane. The latter type of silicone oil is disclosed in U.S. Pat. No. 2,834,748. Specific examples include

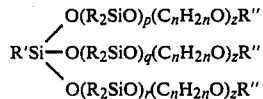

wherein R, R' and R'' are alkyl radicals having 1 to 4 carbon atoms; p, q and r each have a value of from 4 to 8 and $(C_nH_{2n}O)_z$ is a mixed polyoxyethylene oxypropylene group containing from 15 to 19 oxyethylene units and from 11 to 15 oxypropylene units with z equal to from about 26 to about 34. Most preferred is a compound having the formula

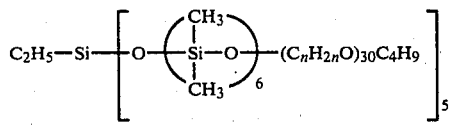

wherein $(C_nH_{2n}O)$ is a mixed polyoxyethylene and oxypropylene block copolymer containing about 17 oxyethylene units and about 13 oxypropylene units. Other suitable stabilizers are disclosed in Canadian Patents 668,537; 668,478 and 670,091. Other suitable compounds may therefore have the formula $(R')(SiO_3)_x(R_2SiO)_y[(C_nH_{2n}O)_zH]_a[R''']_{3x-a}$ where x is an integer and represents the number of trifunctional silicone atoms bonded to a single monovalent or polyvalent hydrocarbon radical, R'; R is a monovalent hydrocarbon group as defined above; a is an integer having a value of at least 1 and represents the number of polyoxyalkylene chains in the block copolymer; y is an integer having a value of at least 3 and denotes the number of difunctional siloxane units, n is an integer of from 2 to 4 denoting the number of carbon atoms in the oxyalkylene group, and z is an integer having a value of at least 5 and denotes the length of the oxyalkylene chain. It will be understood further that such compositions of matter are mixtures of such block copolymers wherein y and z are of different values and that method of determining the chain length of the polysiloxane chains and the polyalkylene chains give values which represent average chain lengths. In the above formula, R represents monovalent hydrocarbon radicals, such as alkyl, aryl or aralkyl radicals, the polyoxyalkylene chain terminates with a hydrogen atom, R''' is an alkyl radical or a trihydrocarbonsilyl radical having the formula $R_3Si$— where R is a monovalent hydrocarbon radical and terminates a siloxane chain, and R' represents a monovalent or polyvalent hydrocarbon radical, being monovalent when x is 1, divalent when x is 2, trivalent when x is 3, tetravalent when x is 4.

One type of block copolymer is represented when x in the above formula is one, and in this instance a branched chain formula may be postulated as follows:

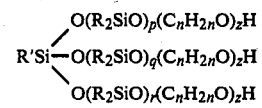

where p+q+r has a minimum value of 3, the other subscripts being the same as in the immediately foregoing formula. In this instance, all three of the oxyalkylene chains are joined to the end of polysiloxane chains of the type —$(R_2SiO)$—. Specifically, one could use

Any suitable blowing agent may be used including reactive and inert types, such as, for example, water, low boiling hydrocarbon such as pentane, hexane, heptane, pentene, heptene, benzene and the like, azo compounds such as azohexahydro benzodinitrile and the like, halogenated hydrocarbons such as dichlorodifluoromethane, dichlorodifluoroethane, trichlorofluoromethane, isopropyl chloride, methylene chloride and the like, acetone or one may whip in a gas such as air, nitrogen, carbon dioxide or the like to make a foamed polymer.

It is important to the invention to use a catalyst for the preparation of the foam from the organic polyisocyanate and any suitable catalyst may be used which will give the proper rate of polymer growth so that cellulation will occur under the reaction conditions. Generally speaking, it has been found that the rate of catalysis is somewhat related to the temperature of the reaction and that some catalysts promote the reaction at room temperature while others promote it preferentially at higher temperatures.

The preferred catalysts are those which will cause gelation of the isocyanate to form an isocyanurate at a temperature of 20° C. in 10 minutes when mixed in an amount of 1 to 10 grams of the catalyst per 100 grams of the organic polyisocyanate. Catalysts which meet these requirements include sodium phenate, sodium trichlorophenate, 2,4,6-tris-(dimethylaminomethyl)-phenol, a mixture of 80 percent ortho and 20 percent para dimethylaminomethyl phenol and the like. It is also possible to use other catalysts which will cause the formation of isocyanurates at temperatures above 20° C. but if these catalysts are used it is necessary to suffer the disadvantage of using a higher temperature and pressure or a blowing agent which will not expand until the higher temperature is reached. Other catalysts which may be used even if higher temperatures are required include those set forth above as well as alkali metal hydroxides such as sodium hydroxide, alkali metal cyanides such as sodium cyanide, alkali metal alkoxides such as sodium methoxide, potassium methoxide and the like, quaternary ammonium hydroxides such as tetramethyl ammonium hydroxide, quaternary ammonium alkoxides such as tetramethyl ammonium ethoxides, substituted pyridines such as 2-hydroxy pyridine, tertiary amines alone or in combination with epoxides, imines, aldehydes or lactones such as triethylene diamine alone or in combination with propylene oxide or ethylene oxide or in combination with N-ethyl ethylene imine, formaldehyde or gamma-butyrolacetone, alkylene imines such as beta-phenylethyl ethylene imine alone, triazine derivatives such as hexahydrotriazine and the like, metallic hydrides such as lithium hydride, metallic carboxylates such as potassium acetate, sodium naphthenate, lead naphthenate, lead benzoate, lead octoate, organo tin alkoxides and oxides such as tri-n-butyl tin oxide, tin tetrabutylate, trialkyl metal oxides of Group V elements including phosphorus, antimony and arsenic such as tri(n-butyl) phosphine oxide, tri-(n-butyl) antimony oxide, tri-(n-butyl) arsenic oxide and the like.

The polyisocyanurate foams have very good thermal stability compared to other rigid foams known heretofore and very good resistance to the effects of high temperatures. Consequently, these foams can be used for insulating stoves and the like where the heretofore known rigid foams such as polyvinylchloride foam, polyurethane foam and the like have been excluded because of their poor high temperature stability. The isocyanurate foams of this invention have good stability up to temperatures of about 300° C. and therefore are eminently suitable for such applications.

This invention is further illustrated by the following examples in which parts are by weight unless otherwise specified.

EXAMPLE 1

About 15 parts of a propylene oxide adduct of trimethylol propane, having three hydroxyl groups and a molecular weight of about 425, are mixed at about 20° C. with about 25 parts of trichlorofluoromethane, about 2 parts of a silicone oil having the formula

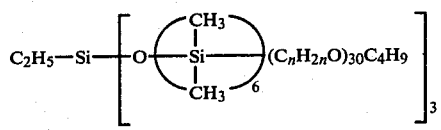

wherein ($C_nH_{2n}O$) is a mixed polyoxyethylene oxypropylene block copolymer containing about 17 oxyethylene units and about 13 oxypropylene units and about 7 parts of 2,4,6-tris(dimethylaminomethyl)phenol. This mixture is then rapidly mixed for about 10 seconds at about 20° C. with about 100 parts of a mixture of polyisocyanates having the formula:

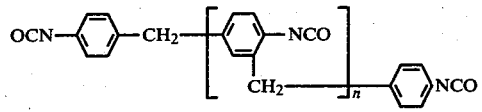

wherein n has an average value of about 0.7 and which contains about 50 percent diisocyanate, about 20 percent triisocyanate and the balance tetra- and penta-isocyanates sufficient to give n a value of about 0.7. The liquid reaction mixture is poured into a mold where it begins to foam within about 15 seconds. Within about 2.5 minutes the foam rises to form a foam which cures to a hard fine-pored mass having a density of about 1.6 pounds per cubic foot.

This foam is rated as non-burning when tested according to ASTM test D-1692-69T. In the torch penetration test where the tip of the flame of a propane torch having a flame temperature of 2,000° F. is placed in contact with the foam, it takes 30 minutes for the torch to penetrate a one inch thickness. In the tunnel test, ASTM test E-84 the foam achieves the following ratings:

| | |
|---|---|
| Flame spread | 23 |
| Fuel contribution | 20 |
| Smoke developed factor | 284 |

These ratings can be better appreciated when one realizes that urethane foams even with flame retardant additives show flame spread above 50 whereas a maximum rating of 25 has been established in many building codes for floor and ceiling assemblies. The smoke developed factor has been coming into more prominence in building codes and this foam formulation brings it below the 300 mark, one of the cut-off points in some building codes. When the foregoing example is repeated exactly except that the 15 parts of propylene oxide adduct of trimethylol propane is omitted a foam having the same density and outward appearance is obtained but the smoke developed factor according to ASTM test E-84 is 353 and it takes only one minute for the torch to penetrate the sample. In addition, the foam pops and bursts into fragments in a fire.

EXAMPLE 2

Example 1 is repeated using 2 parts of the same propylene oxide adduct of trimethylol propane described therein instead of 15 parts. The torch penetration takes 14 minutes on this sample and ASTM E-84 achieves the following ratings:

| | |
|---|---|
| Flame spread | 20 |
| Fuel contribution | 21 |
| Smoke developed | 270 |

The foam is nonburning according to ASTM D-1692.

When this example is repeated using one part of the propylene oxide/trimethylol propane adduct, a completely brittle product is obtained which explodes when contacted with a flame and generates a large quantity of smoke.

EXAMPLE 3

Repeating Example 1 with 20 parts of the same propylene oxide adduct of trimethylol propane described therein instead of 15 parts will demonstrate that flammability characteristics rapidly go to unsatisfactory levels when the amount of polyol is increased. This is foam which is non-burning according to ASTM D-1692-59T and torch penetration takes 32 minutes but it fails to pass building code requirements by ASTM E-84. The following are typical results:

| | |
|---|---|
| Flame spread | 30 |
| Fuel contribution | 35 |
| Smoke developed | 450 |

EXAMPLE 4

Example 1 is repeated replacing the mixture of polyisocyanates with a mixture of 80 percent 2,4- and 20 percent 2,6-toluylene diisocyanate in another. The torch penetration times for these foams is less than 5 minutes and the smoke density factors are over 400.

EXAMPLE 5

Example 1 is repeated substituting 10 parts of tripropylene glycol in one case and 10 parts of a polyether having a functionality of 2 and prepared by condensing propylene oxide to a molecular weight of about 2,000 in a second experiment for comparison purposes. The foam produced using tripropylene glycol was brittle and commercially useless while the foam prepared from the 2,000 molecular weight polyol was not.

EXAMPLE 6

Example 1 is repeated substituting about 8 parts of a propylene oxide adduct of sucrose having a molecular weight of about 1,100 and a functionality of 8. The foam produced was very brittle and completely unsuitable for commercial purposes.

EXAMPLE 7

Example 1 is repeated replacing the mixture of polyisocyanates with a mixture of about 97 percent 4,4'-diphenylmethane diisocyanate and about 3 percent of 2,4'-diphenylmethane diisocyanate. The torch penetration takes about 16 minutes on the foam thus prepared and the foam is non-burning according to ASTM D-1692. The foam produced is nonbrittle and retains good properties. Furthermore, the foam does not explode when contacted with a flame nor does it generate large quantities of smoke.

It is to be understood that the foregoing examples are given for the purpose of illustration and that any other suitable active hydrogen compound, catalyst, stabilizer or the like can be used provided that the teachings of this disclosure are followed.

Although the invention has been described in considerable detail in the foregoing, it is to be understood that such detail is solely for the purpose of illustration and that variations can be made therein by those skilled in the art without departing from the spirit and scope of the invention.

What is claimed is:

1. A foamed polymer prepared by a process which comprises reacting a mixture of polyaryl alkylene polyisocyanates having the formula:

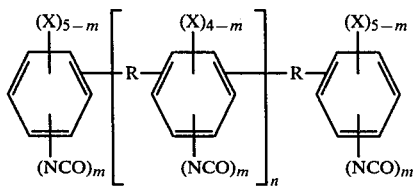

wherein R is an organic radical obtained by removing the carbonyl oxygen from an aldehyde or ketone, m is 1 or 2, X is halogen, lower alkyl or hydrogen and n is 0.1 to 1.5 with from about 2 to about 15 parts by weight of an organic compound per 100 parts of the polyisocyanate mixture, the organic compound containing from 2 to 4 hydroxyl groups as determined by the Zerewitinoff method and having a molecular weight of 350 to 10,000, in the presence of a foam stabilizer, a blowing agent and a catalyst which will trimerize isocyanate groups.

2. The foamed polymer of claim 1 wherein the organic compound has from 2 to 4 hydroxyl groups and a molecular weight of 350 to 5000.

3. The foamed polymer of claim 1 wherein R is $CH_2$, m is 1, X is hydrogen, n is 0.1 to 1.5, said active hydrogen compound is a polyol having 3 to 4 hydroxyl groups and a molecular weight of 350 to 5000, said blowing agent is a halohydrocarbon, said catalyst is one that will cause gelation of an isocyanate in 10 minutes at 20° C. and said foam stabilizer is a polyoxyalkylene block copolymer of a silane.

4. The foamed polymer of claim 3 wherein said catalyst is 4,4,6-tris(dimethylaminomethyl)phenol.

5. The foamed polymer of claim 3 wherein the mixture of isocyanates has the formula

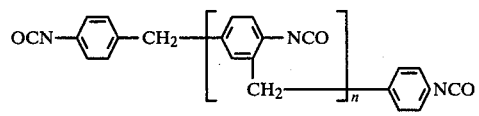

wherein n has an average value of 0.7.

6. A highly flame resistant foam containing isocyanurate groups prepared by reacting in the presence of
   (a) blowing agent and
   (b) a catalyst which will trimerize isocyanates,
   (c) an alcohol having 2 to 4 hydroxyl groups and a molecular weight of 350 to 10,000 with
   (d) a mixtuure of polyaryl alkylene polyisocyanates having the formula:

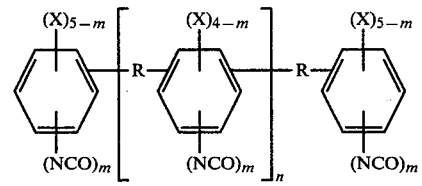

wherein R is an organic radical obtained by removing the carbonyl oxygen from formaldehyde or ketone;
   m is 1 or 2;
   X is selected from halogen, lower alkyl, or hydrogen; and
   n has an average value of from 0.1 to 1.5,
with the proviso that the amount of alcohol (C) used is from 2 to 15 parts by weight per 100 parts by weight of polyaryl alkylene polyisocyanates (D).

* * * * *